(No Model.)
A. D. HOWARD.
MECHANISM FOR DISCHARGING LIQUIDS.
No. 546,615. Patented Sept. 17, 1895.
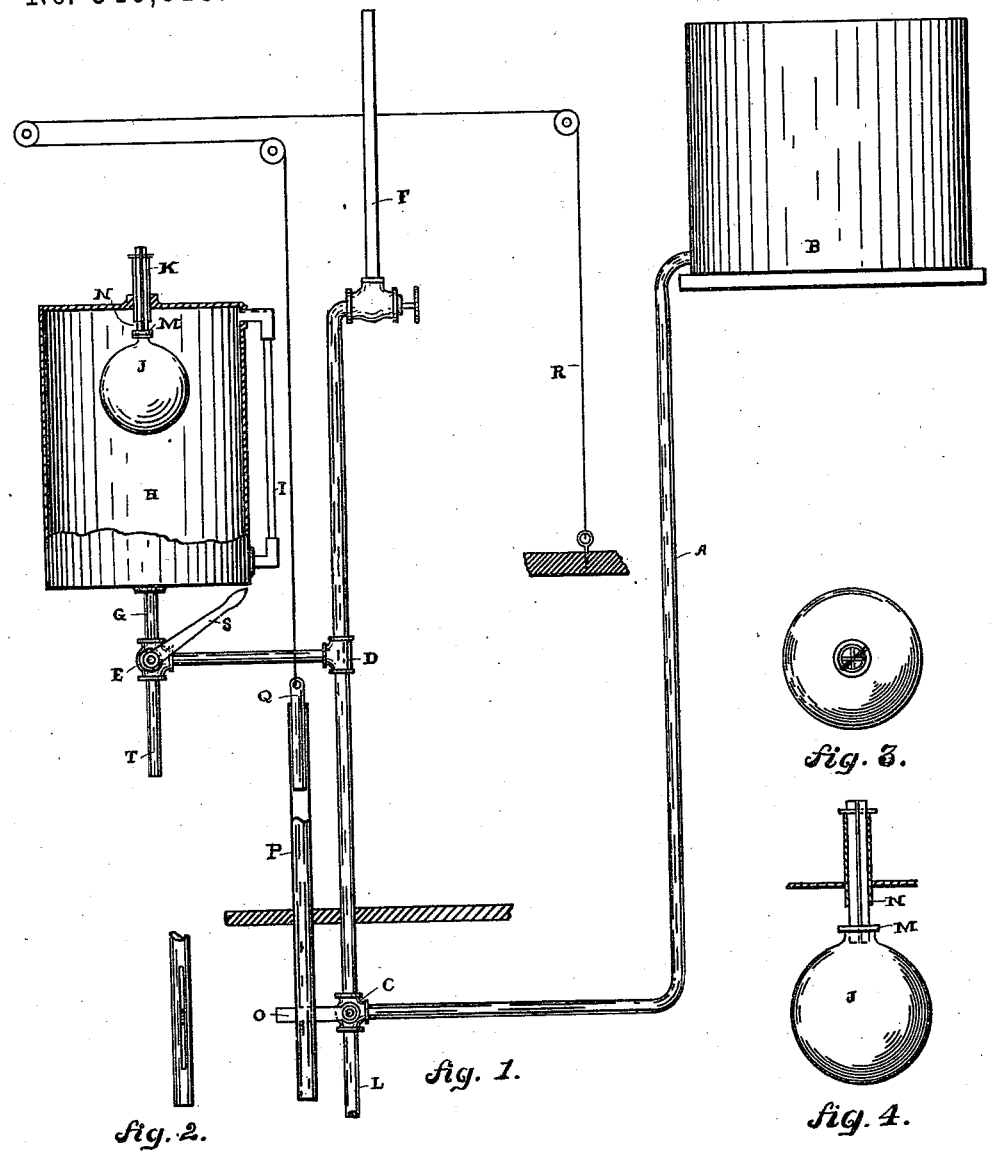
WITNESSES:
C. E. Ard.
H. A. Kellam
INVENTOR
A. D. Howard.
BY
J. S. Moore
ATTORNEY.

UNITED STATES PATENT OFFICE.

ANDREW D. HOWARD, OF ATLANTA, GEORGIA.

MECHANISM FOR DISCHARGING LIQUIDS.

SPECIFICATION forming part of Letters Patent No. 546,615, dated September 17, 1895.

Application filed April 17, 1895. Serial No. 546,160. (No model.)

*To all whom it may concern:*

Be it known that I, ANDREW D. HOWARD, a citizen of the United States, residing at Atlanta, in the county of Fulton, State of Georgia, have invented a new and useful Improvement in Mechanism for Measuring and Discharging Liquids, of which the following is a specification.

My invention relates to improvements in mechanism for measuring and automatically discharging liquids, and is especially adapted for use in handling coal-oil or other explosive oils.

In the accompanying drawings, Figure 1 is a side elevation of a mechanism which embodies my invention. Fig. 2 is a detail of the slotted pipe. Fig. 3 is a plan view of the float used in small tank, and Fig. 4 is a side elevation of same.

B represents the tank in which the supply of oil is kept. The pipe A leading therefrom is connected to a three-way valve C. The pipe L leads from the valve C to an oil-vat away from the building or to a sewer connection. The glass gage F is graduated and shows the amount of oil in tank B. The small tank H is connected to the tank B by means of suitable pipe connections terminating at the three-way valve E, from thence to tank H through pipe-joint G. The small tank H can be made of any capacity, preferably one gallon, and is fitted with a glass gage I, graduated at convenient intervals along its length. The tank H has suspended from and through the top a float J, so made that when a quantity of liquid which is the supposed total capacity of tank H has entered the tank the collar M will rise, strike the glass guide N, and the collar M being of rubber or rubber lined on top an air-tight joint will be formed, thus preventing any further flow of liquid into the tank H.

The lever O, connected to three-way valve C, is straddled by the slotted pipe P. A weight Q is suspended over the lever and in the pipe by means of a cord R, which extends from the weight entirely around the walls of the building in which the apparatus sets, the other end of the string or cord being secured to the wall or another counterweight, as may be desired.

The operation of the device is as follows: The lever O being in position shown, the oil from tank B will fill the pipes and connections and register in the glass gage F. If it is desired to draw a certain quantity of oil, the lever s is pressed down until the oil can flow through the valve E and pipe G into the tank H. The operator watches the liquid rise in the gage I until the desired quantity is registered. The lever S is then quickly raised to position shown and the oil or other liquid will flow out of tank H through valve E and pipe T to vessel beneath. If it be desired to draw the full capacity of the tank H, the liquid is allowed to run into tank until automatically shut off by means of the float J, and also prevent leaking through the top.

It is well known that when fire gets in a building in which there is oil stored the water that is thrown on the oil to extinguish the fire only spreads the same instead of accomplishing the result sought. In the use of this apparatus, should fire break out in the building, the cord R will be burned at some place and allow the weight Q to fall in the pipe and on the three-way-valve lever. The lever will thus be thrown down and the tank B will be connected to an oil-vat on the outside of the building or to the sewer, and the oil will flow out of the tank.

Having thus described my invention, what I claim as new, and desire to secure by Letters Patent of the United States, is—

The main and distributing tanks, the pipes A, G, L, for connecting the two tanks, and the three way valve located at the junction of the two pipes A, L, combined with a slotted pipe through which the handle of the valve extends, a weight placed in the pipe, a cord which extends around the building and is connected at one end to the weight, and guiding pulleys over which the cord passes; the lower end of the pipe L, terminating in a sewer or oil well, substantially as shown and described.

ANDREW D. HOWARD.

Witnesses:
JNO. A. BARNES,
J. E. SWENNER.